United States Patent
Cox et al.

(10) Patent No.: US 7,707,618 B1
(45) Date of Patent: Apr. 27, 2010

(54) SYSTEM AND METHOD FOR IMPLEMENTING ACCESS CONTROLS USING FILE PROTOCOL RULE SETS

(75) Inventors: Benjamin T. H. Cox, Pittsburgh, PA (US); Daniel S. Nydick, Wexford, PA (US)

(73) Assignee: NetApp, Inc., Sunnyvale, CA (US)

( * ) Notice: Subject to any disclaimer, the term of this patent is extended or adjusted under 35 U.S.C. 154(b) by 1357 days.

(21) Appl. No.: 10/856,142

(22) Filed: May 28, 2004

(51) Int. Cl.
*G06F 17/00* (2006.01)
(52) U.S. Cl. .............................. 726/1; 726/26; 726/27
(58) Field of Classification Search ................... 726/2, 726/1, 14, 27; 713/165
See application file for complete search history.

(56) References Cited

U.S. PATENT DOCUMENTS

| | | | | |
|---|---|---|---|---|
| 6,240,442 | B1 * | 5/2001 | Domenikos et al. | 709/203 |
| 6,356,863 | B1 * | 3/2002 | Sayle | 703/27 |
| 7,103,638 | B1 * | 9/2006 | Borthakur et al. | 709/213 |
| 7,249,369 | B2 * | 7/2007 | Knouse et al. | 726/1 |
| 7,272,613 | B2 * | 9/2007 | Sim et al. | 707/102 |
| 7,346,664 | B2 * | 3/2008 | Wong et al. | 709/214 |
| 2002/0116593 | A1 | 8/2002 | Kazar et al. | |
| 2005/0154886 | A1 * | 7/2005 | Birk et al. | 713/168 |
| 2005/0154887 | A1 * | 7/2005 | Birk et al. | 713/168 |
| 2006/0080371 | A1 * | 4/2006 | Wong et al. | 707/204 |

OTHER PUBLICATIONS

Sun Microsystems, Inc., Network Working Group Request for Comments 1094 entitled NFS: Network File System Protocol Specification, Mar. 1989, pp. 1-26.

* cited by examiner

*Primary Examiner*—Jung Kim
*Assistant Examiner*—Samson B Lemma
(74) *Attorney, Agent, or Firm*—Cesari and McKenna, LLP

(57) ABSTRACT

A system and method for limiting access using file-level protocol rule sets. A rule set, comprising of an ordered set of rules, is associated with a virtual file system (VFS). When a data access request is received, the network address of the client originating the data access request is utilized to select a matching rule from the rule set for use in determining access to the VFS. The selected rule is then processed to determine if the data access request is permitted.

53 Claims, 10 Drawing Sheets

| NETWORK ADDRESS 905 | MASK 910 | READ ONLY 915 | READ/WRITE 920 | ROOT 925 |
|---|---|---|---|---|
| 10.0.0.0 | 255.0.0.0 | 0 | 15 | 10 |
| ⋮ | ⋮ | ⋮ | ⋮ | ⋮ |

FIG. 9

SYSTEM AND METHOD FOR IMPLEMENTING ACCESS CONTROLS USING FILE PROTOCOL RULE SETS

FIELD OF THE INVENTION

The present invention relates to file level access controls and, in particular to rule sets for implementing access controls to files.

BACKGROUND OF THE INVENTION

A storage system is a computer that provides storage (file) service relating to the organization of information on storage devices, such as disks. The storage system may be deployed within a network attached storage (NAS) environment and, as such, may be embodied as a file server. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about is other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the SpinFS file system available from Network Appliance, Inc. of Sunnyvale, Calif. The SpinFS file system utilizes a write anywhere technique for user and directory data but writes metadata in place. The SpinFS file system is implemented within a storage operating system of the filer as part of the overall protocol stack and associated disk storage.

Disk storage is typically implemented as one or more storage "volumes" that reside on physical storage disks, defining an overall logical arrangement of storage space. Currently available filer implementations can serve a large number of discrete volumes (150 or more, for example). A physical volume, comprised of a pool of disk blocks, may support a number of logical volumes. Each logical volume is associated with its own file system (i.e., a virtual file system) and, for purposes hereof, the terms volume and virtual file system (VFS) shall generally be used synonymously. The disks supporting a physical volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a SpinFS file system, a RAID 4 implementation may be advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

In a file server environment, including network file system (NFS) server implementations, export lists are typically utilized as an access control mechanism to restrict access to portions of the server's unified view, i.e., name space, of storage resources on a per pathname basis using a network address, such as an Internet Protocol (IP) address, of a client. An export list consists of a set of pairings of mount points and host lists. The mount point identifies a path name, i.e., a location within the file server name space (such as a directory) that is protected by the export list. The host list includes a listing of network addresses to which the export list is applied. Typically, the host list also specifies a set of permissions associated with each network address. When a data access request issued by a client to access, e.g. a file, is received at the server, the pathname of the file is parsed to determine the appropriate mount point. Once the mount point is identified the file server locates the network address in the appropriate host list to determine if access is to be granted.

A noted disadvantage of export lists is the high computational cost involved in authenticating each data access request against the export lists, i.e., the cost of determining the mount point (and permissions) associated with the file referenced by an incoming request. As noted, each incoming data access request must be checked against the export list to see if the client may access the desired data; each data access request thus involves a time delay needed to compute the appropriate path name and associated mount point. When a file server operates under a heavy load, the added computational cost to parse the pathname exacerbates the load of the file server.

SUMMARY OF THE INVENTION

The present invention overcomes the disadvantages of the prior art by providing a technique for efficiently implementing access control to a portion of storage space resources served by a storage system, such as a file server, using export rule sets. The portions of storage space resources are illustratively data containers, such as virtual file systems (VFSs). Each export rule set has a name and a unique numeric identifier. Each incoming data access request served by the file server has a file handle, a subset of which identifies the VFS associated with the request. Instead of implementing access controls to the server's storage space resources on a per pathname basis, the inventive technique implements access controls on a per VFS basis. Accordingly, the file server may quickly determine the VFS of an incoming data access request by examining the file handle identifying the VFS to which the request is directed. Once the VFS is known, the appropriate export rule set needed to process the data access request can be identified quickly. The current invention thus obviates the need to perform computationally intensive processing of path names to determine the appropriate rule sets.

Each path-independent export rule set comprises an ordered list of rules, wherein each rule comprises a network address (and network mask) and an access rule. According to an aspect of the invention, the access rule is implemented as authentication levels required for read access, read/write access and/or administrative (root) access by a client matching the associated network address. Notably, the authentication levels specify the minimum authentication strength required of matching clients to gain read, write and/or administrative (root) access to the VFS. Rules in the rule set are illustratively ordered from most specific to least specific, wherein specificity is determined by the number of bits in the network mask.

When processing an incoming data access request directed to a VFS, a search is performed through the ordered list of rules of the rule set to find a match between the network address of the client and the network address of a rule (ignoring those bits not contained in the netmask). If no match is found, then the data access request is denied. Otherwise, the first rule that matches the data access request is utilized to determine if access is granted to the requested data. If the rule is empty, a default rule is applied to the data access request. Once the rule has been selected, a determination is made whether the authentication strength of the request is sufficient to perform the requested operation. The authentication strength of a client request is typically determined by the client's selection of file access protocol and authentication method, e.g., using NFS-Kerberos or CIFS. If the data access request is properly authenticated the operation is performed by the file server. If the data access request does not have the appropriate authentication strength, the request is denied.

Advantageously, an export rule set is not specific to any fixed path (name) and, as is such, can be applied to any number of VFSs. This allows a user (system administrator) to define rule sets for different classes of data. When a VFS is mounted, the appropriate rule set is associated with the VFS. If the VFS is marked with a certain predefined numeric identifier, the file server utilizes the rule set associated with the mount point as the VFS's rule set, thus enabling a VFS to inherit the rule set of the location where it is mounted. When access rules for one or more VFSs change, the user need only change the export rule set and the change will apply to all VFSs using that rule set.

BRIEF DESCRIPTION OF THE DRAWINGS

The above and further advantages of invention may be better understood by referring to the following description in conjunction with the accompanying drawings in which like reference numerals indicate identical or functionally similar elements:

FIG. 9 is a schematic block diagram of an exemplary rule set in accordance with an embodiment of the present invention;

DETAILED DESCRIPTION OF AN
ILLUSTRATIVE EMBODIMENT

A. Cluster Environment

Figure 1:
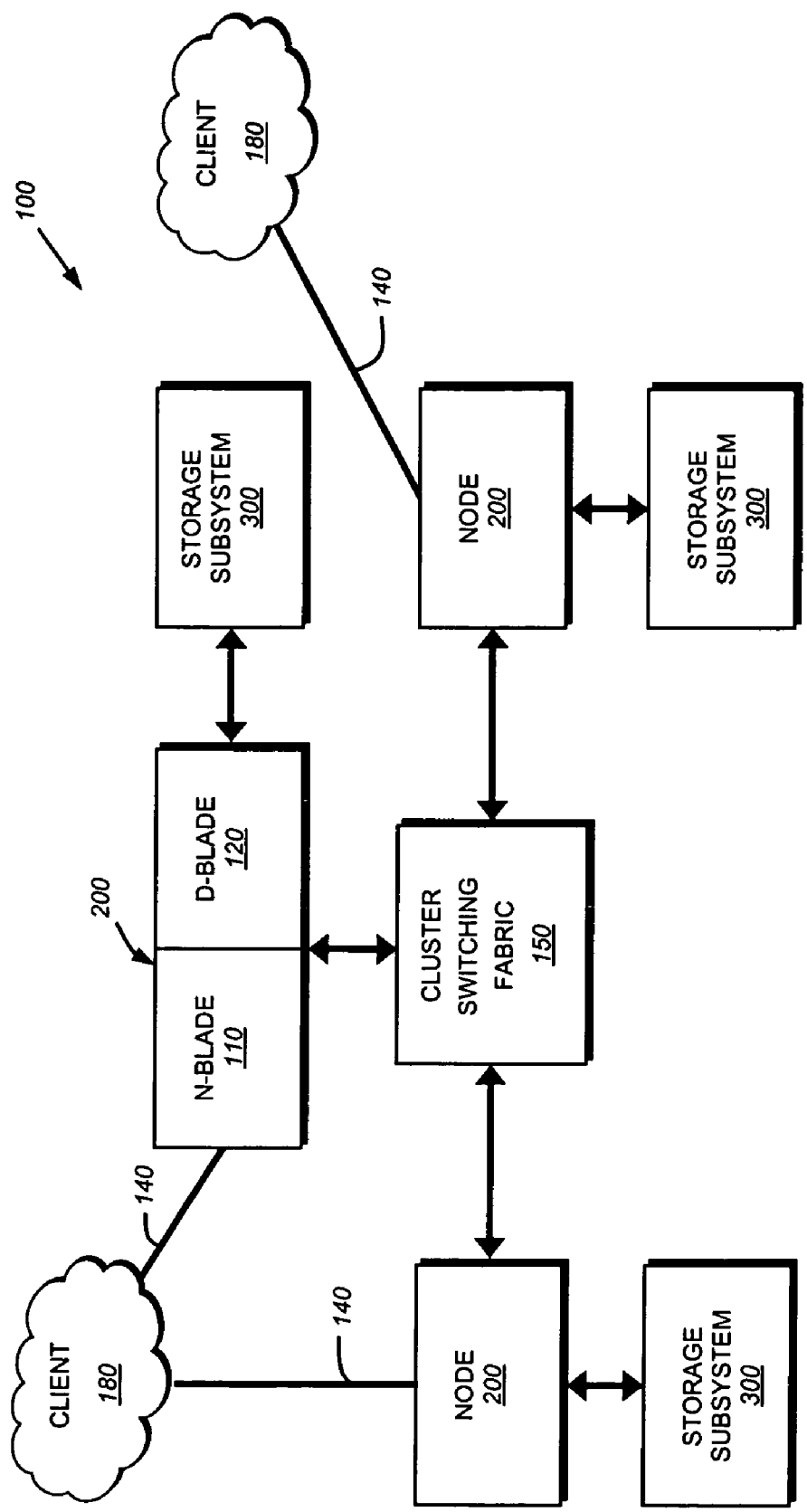
FIG. 1 is a schematic block diagram of a plurality of nodes interconnected as a cluster that may be advantageously used in accordance with an embodiment of the present invention.

FIG. 1 is a schematic block diagram of a plurality of nodes 200 interconnected as a cluster 100 and configured to provide storage service relating to the organization of information on storage devices of a storage subsystem. The nodes 200 comprise various functional components that cooperate to provide a distributed Spin File System (SpinFS) architecture of the cluster 100. To that end, each SpinFS node 200 is generally organized as a network element (N-blade 110) and a disk element (D-blade 120). However, it should be noted that a node 200 may be comprised of any number of N- and D-blades. As such, the description of a node 200 having one N-blade 110 and one D-blade 120 should be taken as illustrative only. The N-blade 110 includes a plurality of ports that couple the node 200 to clients 180 over a computer network 140, while each D-blade 120 includes a plurality of ports that connect the node to a storage subsystem 300. The nodes 200 are interconnected by a cluster switching fabric 150 which, in the illustrative embodiment, may be embodied as a Gigabit Ethernet switch. The distributed SpinFS architecture is generally described in U.S. Patent Application Publication No.

US 2002/0116593 titled Method and System for Responding to File System Requests, by M. Kazar et al. published Aug. 22, 2002.

B. Storage Systems

Figure 2:
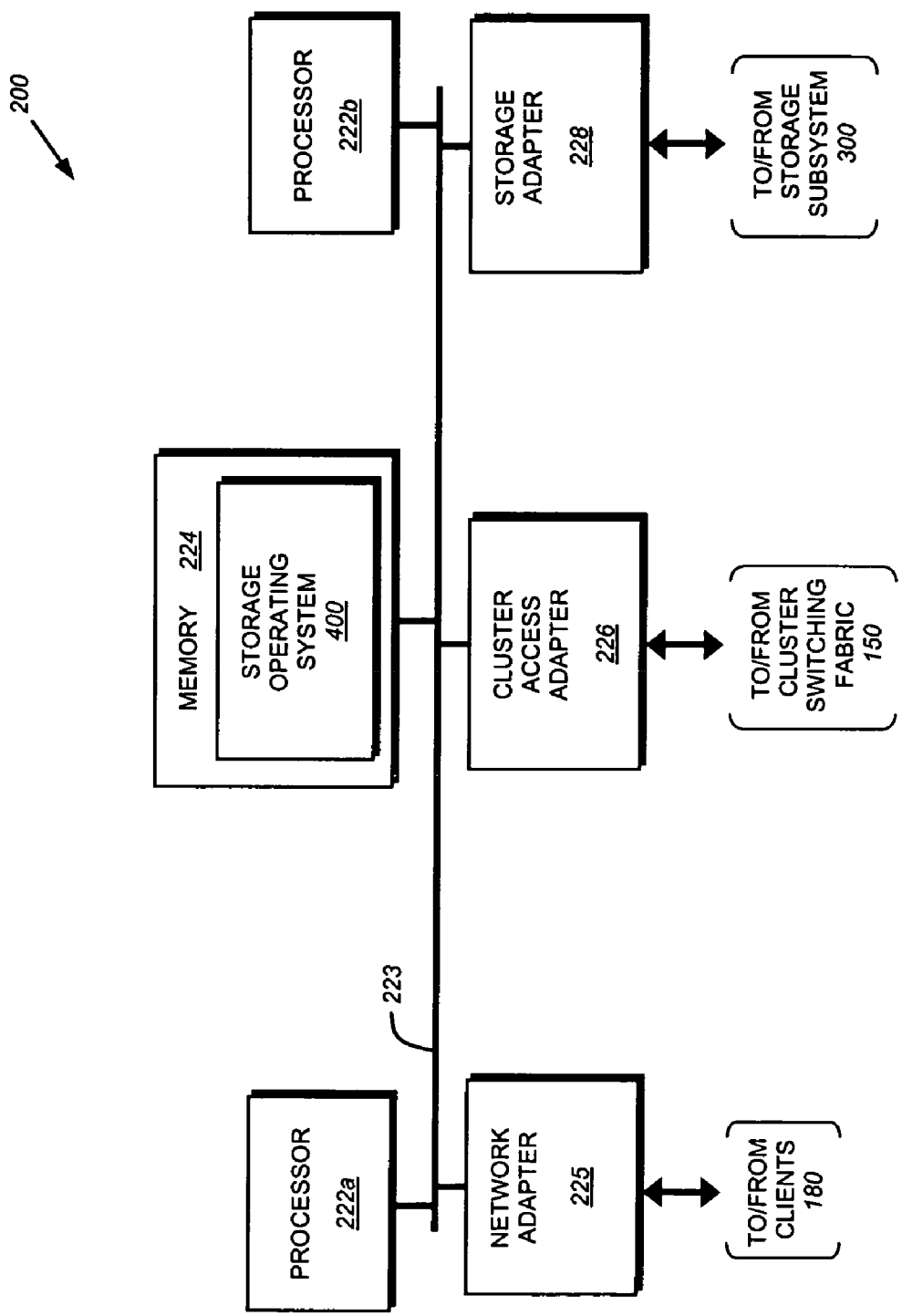
FIG. 2 is a schematic block diagram of a node that may be advantageously used in accordance with an embodiment of the present invention.

FIG. 2 is a schematic block diagram of a node 200 that is illustratively embodied as a storage system server comprising a plurality of processors 222, a memory 224, a network adapter 225, a cluster access adapter 226 and a storage adapter 228 interconnected by a system bus 223. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein.

Each node 200 is illustratively embodied as a dual processor server system executing a storage operating system 400 that provides a file system configured to logically organize the information as a hierarchical structure of named directories and files on storage subsystem 300. However, it will be apparent to those of ordinary skill in the art that the node 200 may alternatively comprise a single or more than two processor system. Illustratively, one processor 222a executes the functions of the N-blade 110 on the node, while the other processor 222b executes the functions of the D-blade 120.

In the illustrative embodiment, the memory 224 comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 400, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the inventive system and method described herein.

The network adapter 225 comprises a plurality of ports adapted to couple the node 200 to one or more clients 180 over point-to-point links, wide area networks, virtual private networks implemented over a public network (Internet) or a shared local area network, a typical example of which will hereinafter be referred to as an Ethernet computer network 140. Therefore, the network adapter 225 may comprise a network interface card (NIC) having the mechanical, electrical and signaling circuitry needed to connect the node to the network. For such a network attached storage (NAS) based network environment, the clients are configured to access information stored on the node 200 as files. The clients 180 typically communicate with each node over network 140 by exchanging discrete frames or packets of data according to pre-defined protocols, such as the Transmission Control Protocol/Internet Protocol (TCP/IP).

The storage adapter 228 cooperates with the storage operating system 400 executing on the node 200 to access information requested by the clients. The information may be stored on disks or other similar media adapted to store information. The storage adapter comprises a plurality of ports having input/output (I/O) interface circuitry that couples to the disks over an I/O interconnect arrangement, such as a conventional highperformance, Fibre Channel (FC) link topology. The information is retrieved by the storage adapter and, if necessary, processed by processor 222 (or adapter 228 itself) prior to being forwarded over the system bus 223 to the network adapter 225 where the information is formatted into packets or messages and returned to the clients.

Figure 3:
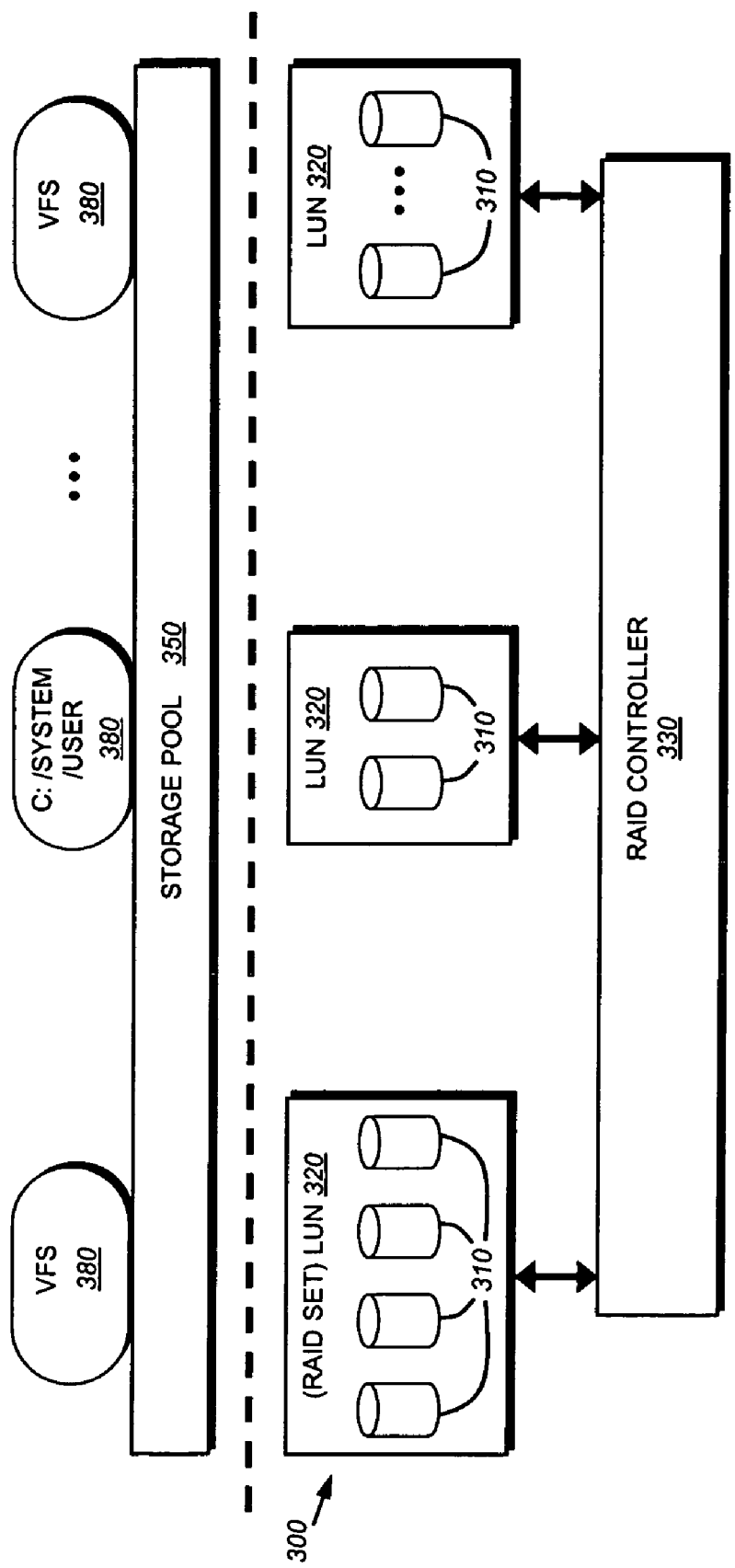
FIG. 3 is a schematic block diagram illustrating the storage subsystem that may be advantageously used in accordance with an embodiment of the present invention.

FIG. 3 is a schematic block diagram illustrating the storage subsystem 300 that may be advantageously used with the present invention. Storage of information on the storage subsystem 300 is illustratively implemented as a plurality of storage disks 310 defining an overall logical arrangement of disk space. The disks may be further organized as one or more groups or sets of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Each RAID set is illustratively configured by one or more RAID controllers 330. The RAID controller 330 exports a RAID set as a logical unit number (LUN 320) to the D-blade 120, which writes and reads blocks to and from the LUN 320. One or more LUNs are illustratively organized as a storage pool 350, wherein each storage pool 350 is "owned" by a D-blade 120 in the cluster 100. Each storage pool 350 is further organized as a plurality of virtual file systems (VFSs 380), each of which is also owned by the D-blade. Each VFS 380 may be organized within the storage pool according to a hierarchical policy that, among other things, allows the VFS to be dynamically moved among nodes of the cluster to, for example, control load among individual storage pools.

In the illustrative embodiment, a VFS 380 is synonymous with a volume and comprises a root directory, as well as a number of subdirectories and files. More generally, a VFS is an example of a data container. A data container is a logical and/or physical allocation of storage that is separately addressable. Other examples of data containers include, a volume, a file, a directory and/or a qtree. A group of VFSs may be composed into a larger namespace. For example, a root directory (c:) may be contained within a root VFS ("/"), which is the VFS that begins a translation process from a pathname associated with an incoming data access request to actual data (file) in a file system, such as the SpinFS file system. The root VFS may contain a directory ("system") or a mount point ("user"). A mount point is a SpinFS object used to "vector off" to another VFS and which contains the name of that vectored VFS. The file system may comprise one or more VFSs that are "stitched together" by mount point objects.

C. Storage Operating System

To facilitate access to the disks 310 and information stored thereon, the storage operating system 400 implements a write-anywhere file system, such as the SpinFS file system, which logically organizes the information as a hierarchical structure of named directories and files on the disks. However, it is expressly contemplated that any appropriate storage operating system, including a write in-place file system, may be enhanced for use in accordance with the inventive principles described herein. Each "on-disk" file may be implemented as set of disk blocks configured to store information, such as data, whereas the directory may be implemented as a specially formatted file in which names and links to other files and directories are stored.

As used herein, the term "storage operating system" generally refers to the computer-executable code operable on a computer that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
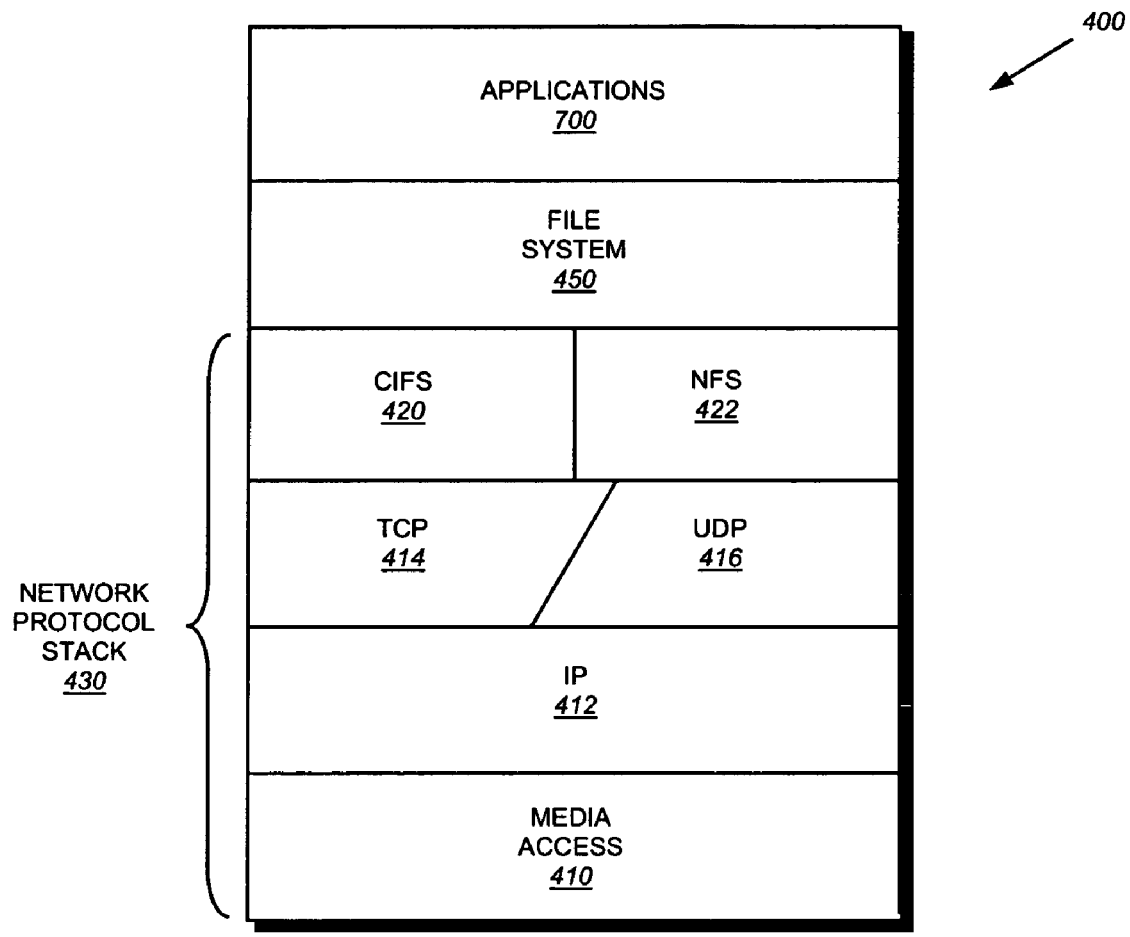
FIG. 4 is a partial schematic block diagram of a storage operating system that may be advantageously used in accordance with an embodiment of the present invention.

FIG. 4 is a partial schematic block diagram of the storage operating system 400 that may be advantageously used with the present invention. The storage operating system comprises a series of software layers organized to form an integrated network protocol stack 430 that provides a data path for clients to access information stored on the node 200 using file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access to a file system 450 (the SpinFS file system) and, thus, includes support for the Common Internet File System (CIFS) protocol 220 and the Network File System (NFS) protocol 222. As described further herein, a plurality of management processes executes as user mode applications 700.

In the illustrative embodiment, the processors 222 share various resources of the node 200, including the storage operating system 400. To that end, the N-blade 110 executes the network protocol stack 430 of the operating system 400 to thereby perform protocol termination with respect to a client issuing incoming NFS/CIFS file access request packets over the network 140. The NFS/CIFS layers of the network protocol stack function as NFS/CIFS servers 422, 420 that translate NFS/CIFS requests from a client into SpinFS protocol requests used for communication with the D-blade 120. The SpinFS protocol is a file system protocol that provides operations related to those operations contained within the incoming file access packets. Local communication between an N-blade and D-blade of a node is preferably effected through the use of message passing between the blades, while remote communication between an N-blade and D-blade of different nodes occurs over the cluster switching fabric 150.

Specifically, the NFS and CIFS servers of an N-blade 110 convert incoming (NFS and CIFS) file access requests into SpinFS primitive operations that are contained within SpinFS packets (requests) that are processed by the D-blades 120 of the cluster 100. Each D-blade 120 provides a disk interface function through execution of the SpinFS file system 450. In the illustrative cluster 100, the file systems 450 cooperate to provide a single SpinFS file system image across all of the D-blades in the cluster. Thus, any network work port of an N-blade that receives a client request can access any file within the single file system image located on any D-blade 120 of the cluster.

Figure 5:
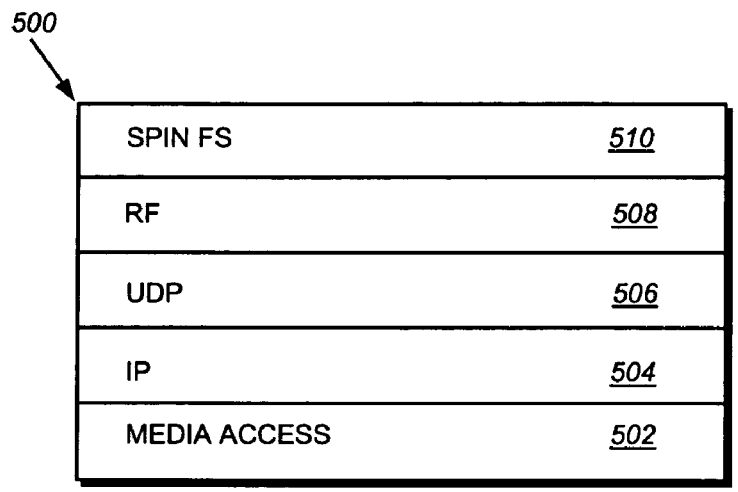
FIG. 5 is a schematic block diagram illustrating the format of a SpinFS request that may be advantageously used in accordance with an embodiment of the present invention.

FIG. 5 is a schematic block diagram illustrating the format of a SpinFS request 500 that illustratively includes a media access layer 502, an IP layer 504, a UDP layer 506, an RF layer 508 and a SpinFS protocol layer 510. As noted, the SpinFS protocol 510 is a file system protocol that provides operations, related to those operations contained within incoming file access packets, to access files stored on the cluster 100. Illustratively, the SpinFS protocol 510 is datagram based and, as such, involves transmission of packets or "envelopes" in a reliable manner from a source (e.g., an N-blade) to a destination (e.g., a D-blade). The RF layer 508 implements a reliable transport protocol that is adapted to process such envelopes in accordance with a connectionless protocol, such as UDP 506.

Figure 6:
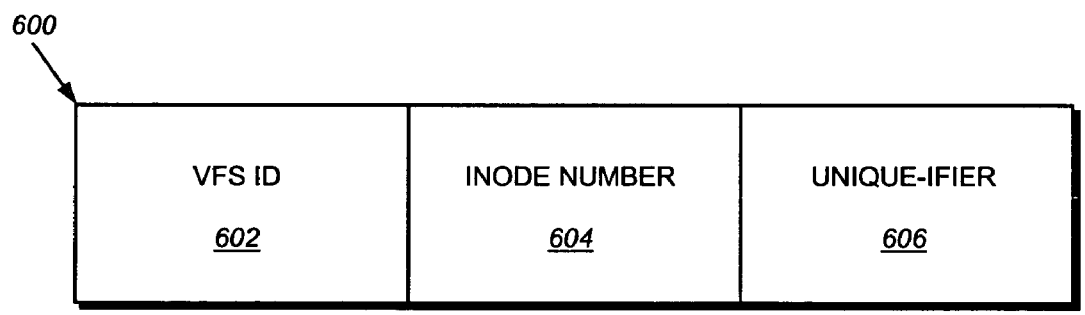
FIG. 6 is a schematic block diagram illustrating the format of a file handle that may be advantageously used in accordance with an embodiment of the present invention.

Files are accessed in the SpinFS file system 450 using a file handle. FIG. 6 is a schematic block diagram illustrating the format of a file handle 600 including a VFS ID field 602, an Mode number field 604 and a unique-ifier field 606. The VFS ID field 602 contains an identifier of a VFS that is unique (global) within the entire cluster 100. Thus, in the illustrative embodiment, the VFS of a given data access request may be identified quickly without the need for computationally intensive pathname searching as required by the prior art. It should be noted that in alternate embodiments, a file handle may not include a VFS ID field 602. In those alternate embodiments, the present invention (as described further herein) may be modified to perform a conventional pathname lookup to determine an appropriate rule set to utilize with a concomitant increase in computational expenditure. The inode number field 604 contains an inode number of a particular inode within an inode file of a particular VFS. The unique-ifier field 606 contains a monotonically increasing number that uniquely identifies the file handle 600, particularly in the case where an inode number has been deleted, reused and reassigned to a new file. The unique-ifier distinguishes that reused inode number in a particular VFS from a potentially previous use of those fields.

Figure 7:
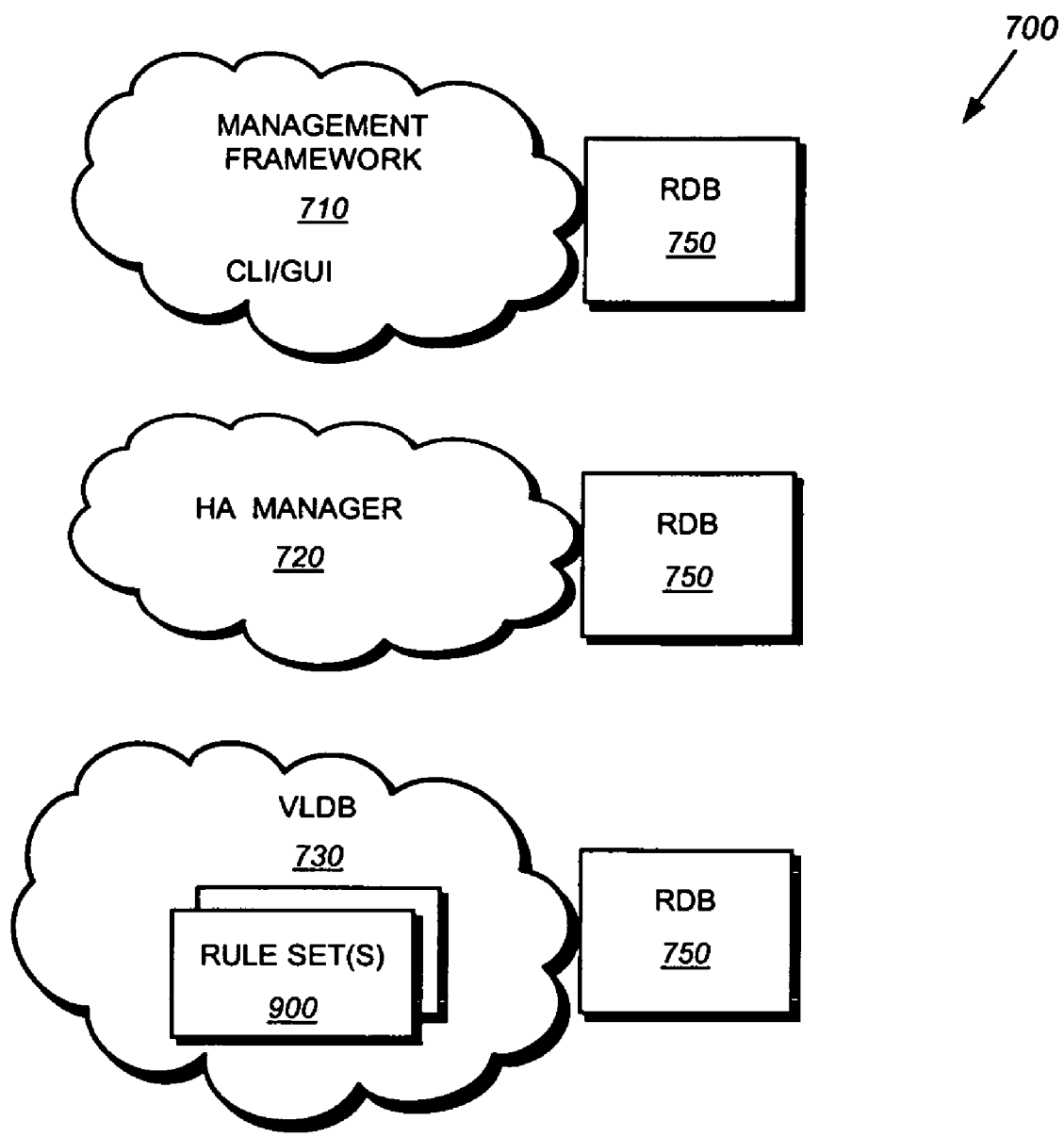
FIG. 7 is a schematic block diagram illustrating a collection of management processes that may be advantageously used in accordance with an embodiment of the present invention.

FIG. 7 is a schematic block diagram illustrating a collection of management processes that execute as user mode applications 700 on the storage operating system 400. The management processes include a management framework process 710, a high availability manager (HA Mgr) process 720, a VFS location database (VLDB) process 730 and a replicated database (RDB) process 750. The management framework 710 provides a user interface via a command line interface (CLI) and/or graphical user interface (GUI). The management framework is illustratively based on a conventional common interface model (CIM) object manager that provides the entity to which users/system administrators interact with a node 200 in order to manage the cluster 100.

The HA Mgr 720 manages all network addresses (IP addresses) of all nodes 200 on a cluster-wide basis. For example, assume a network adapter 225 having two IP addresses (IP1 and IP2) on a node fails. The HA Mgr 720 relocates those two IP addresses onto another N-blade of a node within the cluster to thereby enable clients to transparently survive the failure of an adapter (interface) on an N-blade 110. The relocation (repositioning) of IP addresses within the cluster is dependent upon configuration information provided by a system administrator. The HA Mgr 720 is also responsible for functions such as monitoring an uninterrupted power supply (UPS) and notifying the D-blade to write its data to persistent storage when a power supply issue arises within the cluster.

The VLDB 730 is a database process that tracks the locations of various storage components (e.g., a VFS) within the cluster 100 to thereby facilitate routing of requests throughout the cluster. In the illustrative embodiment, the N-blade 110 of each node has a look up table that maps the VS ID 602 of a file handle 600 to a D-blade that "owns" (is running) the VFS 380 within the cluster. The VLDB provides the contents of the look up table by, among other things, keeping track of the locations of the VFSs 380 within the cluster. The VLDB has a remote procedure call (RPC) interface, e.g., a Sun RPC interface, which allows the N-blade 110 to query the VLDB 730. When encountering a VFS ID 602 that is not stored in its mapping table, the N-blade sends an RPC to the VLDB process. In response, the VLDB 730 returns to the N-blade the appropriate mapping information, including an identifier of the D-blade that owns the VFS. The N-blade caches the information in its look up table and uses the D-blade ID to forward the incoming request to the appropriate VFS 380.

All of these management processes have interfaces to (are closely coupled to) the RDB 750. The RDB comprises a library that provides a persistent object store (storing of objects) pertaining to configuration information and status throughout the cluster. Notably, the RDB 750 is a shared database that is identical (has an identical image) on all nodes 200 of the cluster 100. For example, the HA Mgr 720 uses the RDB library 850 to monitor the status of the IP addresses within the cluster. At system startup, each node 200 records the status/state of its interfaces and IP addresses (those IP addresses it "owns") into the RDB database.

According to one aspect of the present invention, rule sets 900, described further below, are included in the VLDB 730. The VLDB 730 propagates the rule sets 900 through the RDB 750, thereby enabling access by all nodes in a cluster to the rule sets. In accordance with the illustrative embodiment, the rule sets are created and managed through the CLI and/or GUI embodied in the management framework 710 of the storage operating system.

Operationally, requests are issued by clients 180 and received at the network protocol stack 430 of an N-blade 110 within a node 200 of the cluster 100. The request is parsed through the network protocol stack to the appropriate NFS/CIFS server, where the specified VFS 380 (and file), along with the appropriate D-blade that "owns" that VFS, are determined. The appropriate server then translates the incoming request into a SpinFS request 500 that is routed to the D-blade. The D-blade receives the SpinFS request and apportions it into a part that is relevant to the requested file, as well as a part that is relevant to specific access (read/write) allocation with respect to blocks on the disk. All functions and interactions between the N-blade 110 and D-blade 120 are coordinated on a cluster-wide basis through the collection of management processes and the RDB library user mode applications 700.

Figure 8:
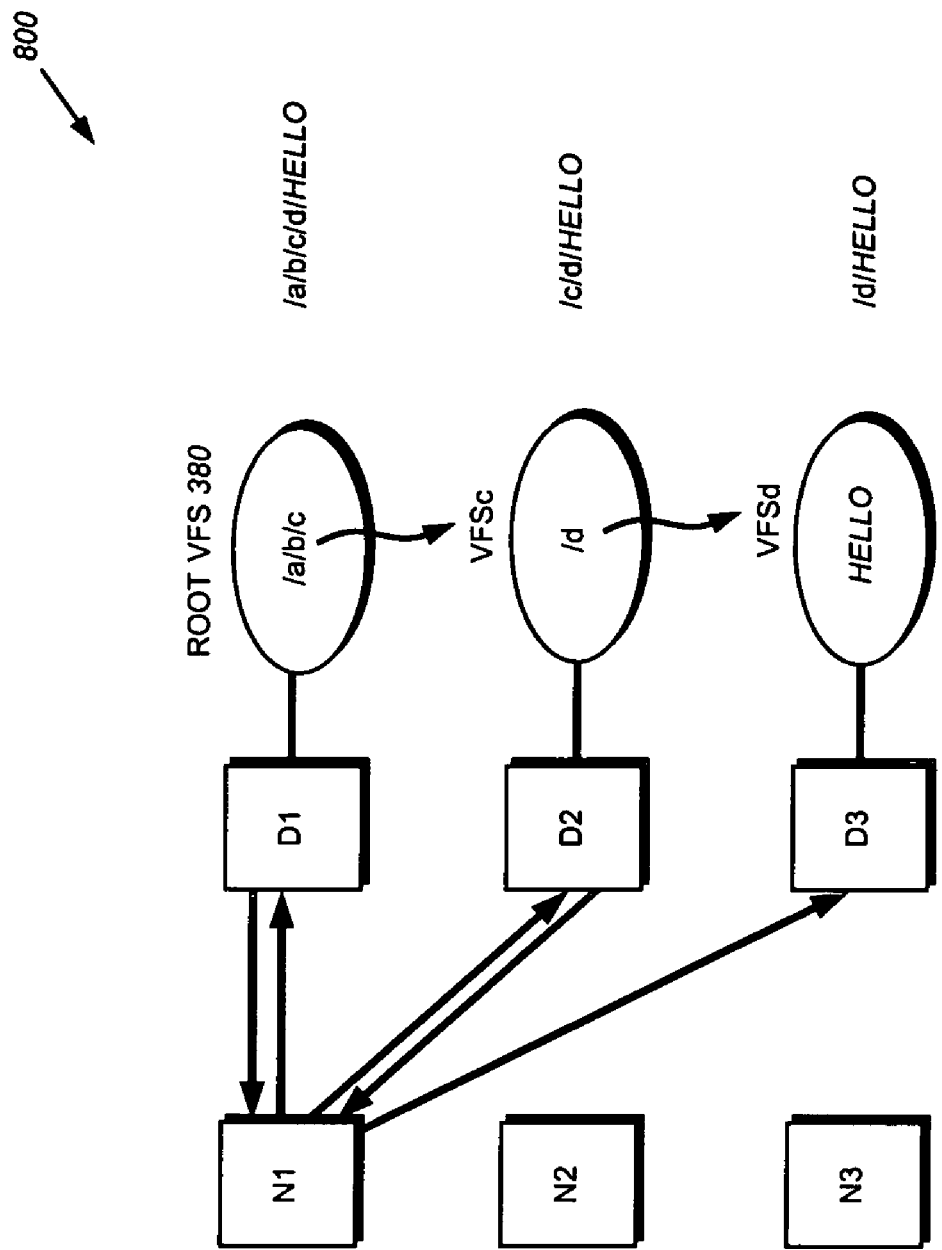
FIG. 8 is a schematic block diagram illustrating a distributed file system arrangement for processing a file access request in accordance with an embodiment of the present invention.

FIG. 8 is a schematic block diagram illustrating a distributed file system (SpinFS) arrangement 800 for processing a file access request at nodes 200 of the cluster 100. Assume a CIFS request packet specifying an operation directed to a file having a specified pathname is received at an N-blade 110 of a node 200. Specifically, the CIFS operation attempts to open a file having a pathname /a/b/c/d/Hello. The CIFS server 420 on the N-blade 110 performs a series of lookup calls on the various components of the pathname. Broadly stated, every cluster 100 has a root VFS 380 represented by the first "/" in the pathname. The N-blade 110 performs a lookup operation into its lookup table to determine the D-blade "owner" of the root VFS and, if that information is not present in the lookup table, forwards a RPC request to the VLDB 730 in order to obtain that location information. Upon identifying the D-blade D1 as the owner of the root VFS, the N-blade 110 forwards the request to D1, which then parses the various components of the pathname.

Assume that only a/b/ (e.g., directories) of the pathname are present within the root VFS. According to the SpinFS protocol, the D-blade parses the pathname up to a/b/, and then returns (to the N-blade) the D-blade ID (e.g., D2) of the subsequent (next) D-blade that owns the next portion (e.g., c/) of the pathname. Assume that D3 is the D-blade that owns the subsequent portion of the pathname (d/Hello). Assume further that c and d are mount point objects used to vector off to the VFS that owns file Hello. Thus, the root VFS has directories a/b/ and mount point c that points to VFS c which has (in its top level) mount point d that points to VFS d that contains file Hello. Note that each mount point may signal the need to consult the VLDB 730 to determine which D-blade owns the VFS and, thus, to which D-blade the request should be routed.

The N-blade (N1) that receives the request initially forwards it to D-blade D1, which send a response back to N1 indicating how much of the pathname it was able to parse. In addition, D1 sends the ID of D-blade D2 which can parse the next portion of the pathname. N-blade N1 then sends to D-blade D2 the pathname c/d/Hello and D2 returns to N1 an indication that it can parse up to c/, along with the VFS containing the next portion of the path. The N-blade accessed the VLDB to locate the next D-blade (D3). N1 then sends the remaining portion of the pathname to D3, which then accesses the file Hello in VFS d. Note that the distributed file system arrangement 800 is performed in various parts of the cluster architecture including the N-blade 110, the D-blade 120, the to VLDB 730 and the management framework 710.

D. File Protocol Rule Sets

The present invention overcomes the disadvantages of the prior art by providing a technique for efficiently implementing access control to a portion of storage space resources served by a storage system, such as a file server, using export rule sets. The portions of storage space resources are illustratively data containers, such as virtual file systems (VFSs). As noted above, a data container is a logical and/or physical allocation of storage that is separately addressable. The illustrative embodiment utilizes a VFS as a data container; however, the principles of the present invention apply to any acceptable data container, including volumes, qtrees or virtual disks (vdisks). Each export rule set has a name and a unique numeric identifier. Each incoming data access request served by the file server has a file handle, a subset of which identifies a VFS associated with the request. Instead of implementing access controls to the server's storage space resources on a per pathname basis, the inventive technique implements access controls on a per VFS basis.

Each path-independent export rule set comprises an ordered list of rules, wherein each rule comprises a network address (and network mask) and an access rule. According to an aspect of the invention, the access rule is implemented as authentication rules required for read access, read/write access and/or administrative (root) access by a client matching the associated network address. Notably, the authentication levels specify the minimum authentication strength required of matching clients to gain read, write and/or administrative (root) access to the VFS. Rules in the rule set are illustratively ordered from most specific to least specific, wherein specificity is determined by the number of bits in the network mask.

FIG. 9 is a schematic block diagram of an exemplary rules list in accordance with an embodiment of the present invention. The rules list comprises a series of entries 930, each of which includes a series of fields. Fields include a network address field 905, a mask field 910, a read only field 915, a read/write field 920 and a root field 925. In alternate embodiments additional and/or differing fields may be utilized in each entry. The to network address field 905 contains a network address to be associated with the entry. The mask field 910 identifies the significant bits of the network address field. Thus, for example in the exemplary entry 930, network address 10.0.0.0 and mask field 255.0.0.0 will result in equating to any network address 10.X.X.X, i.e., any network address in this subnet.

The read only field 915 identifies the minimum authentication strength required for any access to the specified VFS. In certain embodiments, the storage operating system assigns an authentication strength to each data access request based on the form of authentication used. For example, a conventional NFS data access request, which includes no secure authentication mechanism, may have an authentication strength of 0. A CIFS request may have a value of 5. A predetermined value, e.g. 15, may signify the maximum authentication strength, which may, in certain embodiments, mean that no access is available to that VFS. Similarly, the read/write field 920 identifies the minimum authentication strength required to write data to the specified VFS. The root field 925 identifies a minimum authentication strength require for a user to access root (or administrator) level functionality from the network address.

As the rule set is an ordered list of rules, when processing a data access request, the file system will utilize the first rule that matches the received network address. In the illustrative embodiment, the management framework orders the rules from most specific to most general (least specific). As used herein, specificity is determined by the number of bits in the network mask field. For example, a network (IP) address that has all bits that "matter," i.e., all bits of the address are significant with respect to the mask field, is more specific than any network address that has only a subset of significant bits. Administrators generate a rule set by the use of CLI and/or GUI operations to create and assign rule sets to a VFS.

In alternate embodiments, the network address field 905 and mask field 910 may be replaced with a netgroup name field. The netgroup represents a collection of network addresses, all of which match the rule. Thus, the netgroup name provides a logical name for a plurality of network addresses, thereby providing easier management of access control. For example, a netgroup named "ENGINEERING" may contain all network addresses of an engineering department. Thus, to provide an access rule for the entire department only a single rule is required.

Figure 10:
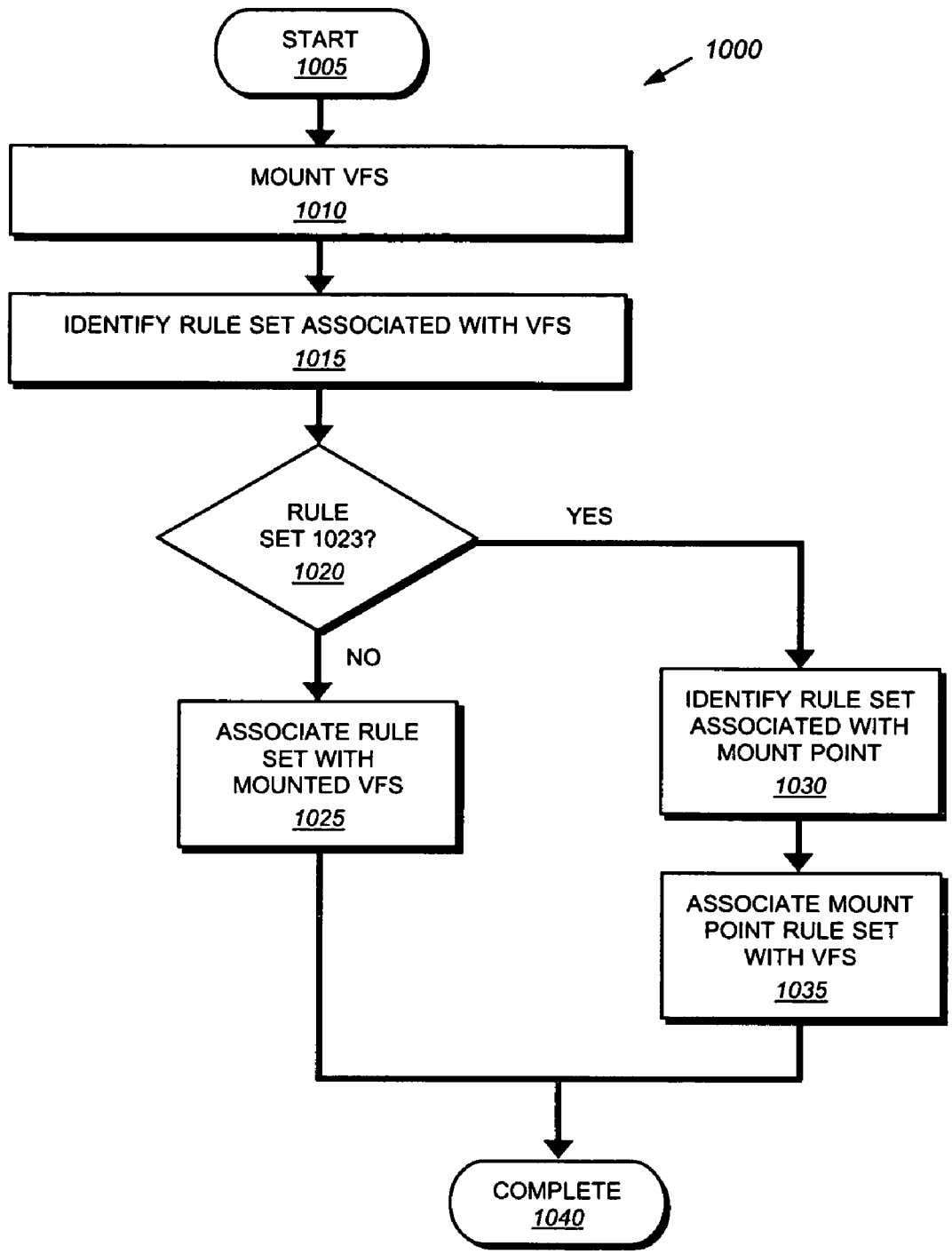
FIG. 10 is a flowchart detailing the steps of a procedure for mounting a VFS in accordance with am embodiment of the present invention.

FIG. 10 is a flowchart detailing the steps of a procedure 1000 for mounting and assigning a rule set with a VFS in accordance with an embodiment of the present invention. The procedure begins in step 1005 and continues to step 1010 where the VFS is mounted to an appropriate mount point. The mount point identifies a path name, i.e., a location within the file server name space (such as a VFS or file) that is protected by the export list. At this time, a rule set associated with the VFS is identified (step 1015). A determination is then made in step 1020 whether a predefined numeric identifier (e.g., rule set number 1023) is associated with this VFS. If a rule set other than the predefined numeric identifier is associated, the procedure continues to step 1025 where the identified rule set is associated with the mounted VFS. The procedure then completes (step 1040).

However, if the predefined numeric identifier (in the illustrative embodiment, rule set number 1023) is associated with the VFS, the procedure branches to step 1030 where the rule set associated with the mount point is identified. This rule set that is identified with the mount point is then associated with the VFS (step 1035). Thus, if a VFS is associated with rule set 1023, it inherits the rule set associated with the location to which it is mounted. The procedure is then complete in step 1040. It should be noted that in the illustrative embodiment, rule set 1023 is utilized to signify that a VFS should inherit the rule set associated with its mount point. However, the present invention may be generalized so that any predefined rule set number may indicate that the VFS should inherit the rule set of its mount point. As such, the use of rule set 1023 should be taken as exemplary only.

Figure 11:
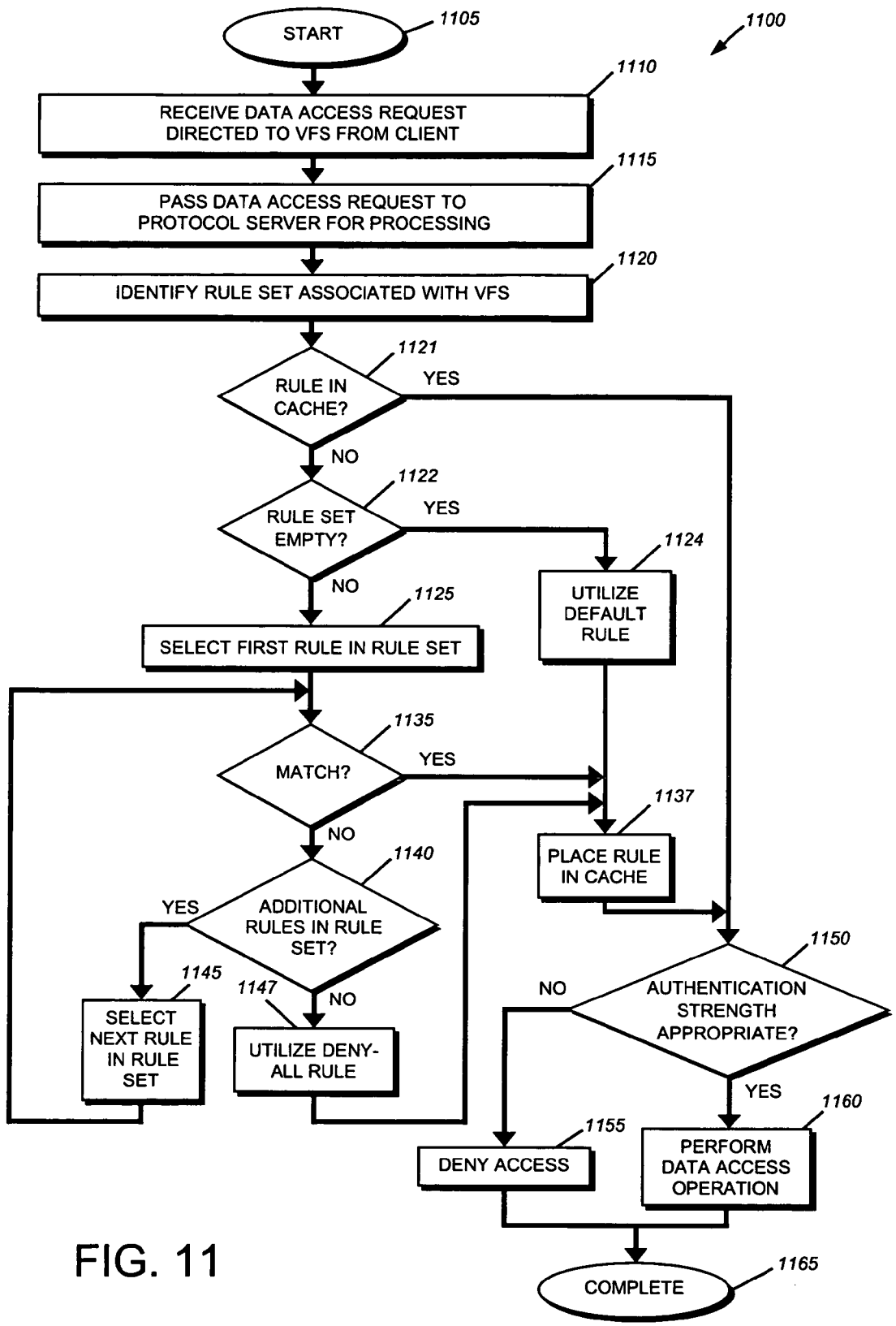
FIG. 11 is a flowchart detailing the steps of a procedure for processing data access requests in accordance with an embodiment of the present invention.

FIG. 11 is a flow chart of an exemplary procedure 1100 for processing data access requests in accordance with an embodiment of the present invention. The procedure starts in step 1105 and continues to step 1110 where a data access request directed to a VFS is received from a client. This is accomplished using conventional file-level protocol operations, such as the passing of conventional NFS operations. Next, in step 1115, the data access request is passed the protocol server for processing. The protocol server, for example the NFS server 422 of the storage operating system, implements the file-level protocol to process a data access request. The protocol server, in conjunction with the VLDB, identifies a rule set associated with the VFS to which the data access request is directed (step 1120). The appropriate VFS is selected by, for example, identifying the VFS ID field 602 of the file handle 600 associated with the data access request. If no rule set is associated with the VFS, a default rule set is utilized. In the illustrative embodiment, the rule set with numeric identifier zero is utilized as the default rule set. In the illustrative embodiment, the ruleset ID associated with a VFS is obtained from the VLDB when the VFS's D-blade location is obtained, thereby obviating the need to perform multiple reads from the VLDB.

Once the appropriate VFS is identified, the location of the VFS, i.e., which D-blade on which it is located, and the numeric identifier of the associated rule set is determined. The rule set is looked up in the in-memory rule set cache (step 1121) to determine if the appropriate rule set is located there. If the rule is in the cache, the procedure branches to step 1150. However, if it is not in the in-memory cache, the VLDB is queried to locate the appropriate rule set. Once the appropriate rule set is located, a determination is made, in step 1122, whether the rule set is empty. In the illustrative embodiment, a rule set may be empty and, in fact, defaults to being empty unless an administrator modifies the rule set. If the rule set is empty, the procedure branches to step 1124 and utilizes a default rule. This default rule illustratively permits all access for read and read/write but does not permit root level access. The procedure branches to step 1137 where the rule is placed in the cache and associated with the current client network address and current rule set.

However, if the rule set is not empty, the procedure continues to step 1125 where the first rule in the rule set is selected and in step 1135, a determination is made if the rule is matched by the appropriate network address of the received data access request. If the data access request does not match the rule, the procedure continues to step 1140 where determination is made if additional rules are in the rule set. If there are additional rules in the rule set, the procedure branches to step 1145 and the next rule in the rule set is selected. Once the next rule in the rule set has been selected, the procedure loops back to step 1135 and continues.

However, if there are no additional rules in the rule set, the procedure branches from step 1140 to step 1147 where a special rule is utilized which always denies all access. The procedure branches to step 1137 where the rule is placed in the cache and associated with the current client network address and current rule set.

If, in step 1135, a match occurs, the procedure branches to step 1137 where the rule is placed in the cache and associated with the current client network address and current rule set. Then the procedure continues to step 1150 where a determination is made if the authentication strength is appropriate for the type of access desired. As noted above, the authentication strength requirements for read access, write access and administrative access are stored in the rule set. The authentication strength is determined by the authentication mechanisms of the N-blade while receiving the data access request. If the authentication strength is sufficient, the procedure continues to step 1160 and performs the requested data access operation before completing in step 1165. However, if the authentication strength is not sufficient, the procedure branches to step 1155 and denies access before completing (step 1165).

Illustratively, the file server caches the identified rule from the rule set for the network address, thereby increasing system performance for later data access requests. This cache may be flushed when, for example, new contents of the rule set are obtained from the VLDB.

To again summarize, the present invention provides a system and method for file level protocol export lists that permit an administrator to specify an authentication strength required to access data. A rule set comprising a number of rules is generated and associated with a data container, such as a VFS. When a data access request is received, the network address of the client is compared to the ordered list of rules in the rule set. The first matching rule in the rule set is utilized in processing the data access request. The file protocol server determines if the data access request has the appropriate authentication strength and, if it does, processes the data access request.

The foregoing description has been directed to particular embodiments of this invention. It will be apparent, however, that other variations and modifications may be made to the described embodiments, with the attainment of some or all of their advantages. For example, while this description has been written in terms of limiting access to is a VFS, the principles of the present invention apply to any generalized data container, including, for example, volumes, qtrees and/ or virtual disks (vdisks). Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method, comprising:
   receiving a data access request directed to a data container, the data access request having a file handle;
   examining a field of the file handle to identify the data container to which the data access request is directed;
   determining, in response to identifying the data container to which the data access request is directed, a location of the data container and a rule set associated with the data container; and
   processing the data access request utilizing one or more rules contained within the rule set associated with the data container.

2. The method of claim 1 wherein the data container is a virtual file system.

3. The method of claim 1 wherein the data container is a volume.

4. The method of claim 1 further comprising:
   ordering the rule set as an ordered list of rules.

5. The method of claim 4 wherein each rule of the rule set comprises a network address, a mask and one or more authentication strength requirements.

6. The method of claim 5 wherein the one or more authentication strength requirements is for read access.

7. The method of claim 5 wherein the one or more authentication strength requirements is for write access.

8. The method of claim 5 wherein the one or more authentication strength requirements is for root access.

9. The method of claim 1 wherein at least one rule of the rule set is a netgroup name.

10. The method of claim 9 wherein the netgroup name has at least the one or more authentication strength requirements for read access.

11. The method of claim 9 wherein the netgroup name has at least the one or more authentication strength requirements for write access.

12. The method of claim 9 wherein the netgroup name has at least the one or more authentication strength requirements for root access.

13. The method of claim 1 further comprising:
   (a) selecting a first rule in the rule set;
   (b) determining if the received data access request matches the selected rule;
   (c) in response to the selected rule not matching the data access request, determining if an additional rule exists in the rule set;
   (d) in response to determining that the additional rule exists in the rule set, selecting a next rule in the export rule set and looping to step (b); and
   (e) in response to determining that the additional rule does not exist in the rule set, denying access to the data access request.

14. The method of claim 1 further comprising:
   (a) determining if the rule set is empty;
   (b) in response to determining that the rule set is empty, utilizing a default rule;
   (c) in response to determining that the rule set is not empty, selecting a first rule in the rule set;
   (d) determining if the received data access request matches the selected rule;
   (e) in response to the selected rule not matching the data access request, determining if an additional rule exists in the rule set;
   (f) in response to determining that the additional rule exists in the rule set, selecting a next rule in the rule set and looping to step (d); and
   (g) in response to determining that the additional rule does not exist in the rule set, denying access to the data access request.

15. A system, comprising:
   means for receiving a data access request directed to a data container, the data access request having a file handle;
   means for examining a field of the file handle to identify the data container to which the data access request is directed;
   means for determining, in response to identifying the data container to which the data access request is directed, a location of the data container and a rule set associated with the data container; and means for processing the data access request utilizing one or more rules contained within the rule set associated with the data container.

16. The system of claim 15 further comprising:
the data container configured as a virtual file system.

17. The system of claim 15 further comprising:
the data container configured as a volume.

18. The system of claim 15 further comprising:
the rule set configured as an ordered list of rules.

19. The system of claim 15 further comprising:
each rule of the rule set configured to have a network address, a mask and one or more authentication strength requirements.

20. The system of claim 19 further comprising:
the one or more authentication strength requirements configured to be for read access.

21. The system of claim 19 further comprising:
the one or more authentication strength requirements configured to be for write access.

22. The system of claim 19 further comprising:
the one or more authentication strength requirements configured to be for root access.

23. The system of claim 15 further comprising:
each rule of the rule set configured to have a netgroup name associated with the one or more authentication strength requirements.

24. The system of claim 23 wherein the netgroup name as at least the one or more authentication strength requirements configured to be for read access.

25. The system of claim 23 the one or more authentication strength requirements configured to be for write access.

26. The system of claim 23 the one or more authentication strength requirements configured to be for root access.

27. A computer readable medium containing executable program instructions executed by a processor, comprising:
program instructions that receive a data access request directed to a data container, the data access request having a file handle;
program instructions that examine a field of the file handle to identify the data container to which the data access request is directed;
program instructions that determine, in response to identifying the data container to which the data access request is directed, a location of the data container and a rule set associated with the data container; and
program instructions that process the data access request utilizing one or more rules contained within the rule set associated with the data container.

28. A system, comprising:
the system configured to receive a data access request directed to a data container, the data access request having a file handle;
the system further configured to examine a field of the file handle to identify the data container to which the data access request is directed;
the system further configured to determine, in response to identifying the data container to which the data access request is directed, a location of the data container and a rule set associated with the data container; and
the system further configured to process the data access request utilizing one or more rules contained within the rule set associated with the data container.

29. The system of claim 28 wherein the rule set comprises one or more ordered set of rules configured to have a network address, a mask and one or more authentication strength requirements.

30. The system of claim 28 further comprising:
(a) the system further configured to select a first rule in the rule set;
(b) the system further configured to determine if the received data access request matches the selected rule;
(c) in response to the selected rule not matching the data access request, the system further configured to determine if an additional rule exists in the rule set;
(d) in response to determining that the additional rule exists in the rule set, the system further configured to select a next rule in the rule set and looping to step (b); and
(e) in response to determining that the additional rule does not exist in the rule set, the system further configured to deny access to the data access request.

31. The system of claim 28 further comprising:
(a) the system further configured to determine if the rule set is empty;
(b) in response to determining that the rule set is empty, the system further configured to utilize a default rule;
(c) in response to determining that the rule set is not empty, the system further configured to select a first rule in the rule set;
(d) the system further configured to determine if the received data access request matches the selected rule;
(e) in response to the selected rule not matching the data access request, the system further configured to determine if an additional rule exists in the rule set;
(f) in response to determining that the additional rule exists in the rule set, the system further configured to select a next rule in the rule set and looping to step (d); and
(g) in response to determining that the additional rule does not exist in the rule set, the system further configured to deny access to the data access request.

32. The system of claim 29 further comprising:
the one or more authentication strength requirements configured to be for write access.

33. The system of claim 29 further comprising:
the one or more authentication strength requirements configured to be for root access.

34. The system of claim 28 further comprising:
each of the ordered set of rules configured to contain a netgroup name associated with the one or more authentication strength requirements.

35. The system of claim 34 the one or more authentication strength requirements configured to be for read access.

36. The system of claim 34 the one or more authentication strength requirements configured to be for write access.

37. The system of claim 34 the one or more authentication strength configured to be for root access.

38. The system of claim 28 further comprising:
a file protocol server configured to select a first rule that matches a network address of a client issuing the data access request.

39. A method for limiting access to a data container, comprising:
receiving a data access request directed to the data container, the data access request having a file handle;
examining a field of the file handle to identify location of the data container to which the data access request is directed;
identifying a rule set associated with the data container that was identified by the examination of the file handle;

determining if a network address of the received data access request is in the rule set to permit access to the data container;

determining, in response to the network address being in the rule set, if a type of access desired by the data access request has a required authentication level; and processing the data access request in response to having permission to access the data container and having the required authentication level of the type of access desired.

40. The method of claim 39 further comprising:

associating a network address and an access rule with one or more rules in the rule set.

41. The method of claim 39 further comprising:

storing the rule set in a Virtual File System Location Database (VLDB).

42. The method of claim 39 further comprising:

ordering rules of the rule set from most specific to least specific.

43. The method of claim 39 further comprising:

identifying a predefined identifier with the data container; and inheriting, by the data container, the rule set associated with the predefined identifier.

44. The method of claim 39 further comprising:

caching an identified rule from the rule set for the network address for later data access requests.

45. The method of claim 44 further comprising:

flushing the cache when new contents of the rule set are obtained.

46. The method of claim 39 wherein the data container is a virtual file system.

47. The method of claim 39 wherein one or more rules of the rule set comprises a network address, a mask and one or more authentication strength requirements.

48. The method of claim 47 wherein at least one of the authentication strength requirements is for read/write access.

49. The method of claim 39 wherein at least one rule of the rule set comprises a netgroup name associated with one or more authentication strength requirements.

50. The method of claim 39 further comprising:

(a) selecting a first rule in the rule set;

(b) determining if the received data access request matches the selected rule;

(c) in response to the selected rule not matching the data access request, determining if an additional rule exists in the rule set;

(d) in response to determining that the additional rule exists in the rule set, selecting a next rule in the rule set and looping to step (b); and (e) in response to determining that the additional rule does not exist in the rule set, denying access to the data access request.

51. The method of claim 39 further comprising:

(a) determining if the rule set is empty;

(b) in response to determining that the rule set is empty, utilizing a default rule;

(c) in response to determining that the rule set is not empty, selecting a first rule in the rule set;

(d) determining if the received data access request matches the selected rule;

(e) in response to the selected rule not matching the data access request, determining if an additional rule exists in the rule set;

(f) in response to determining that the additional rule exists in the rule set, selecting a next rule in the rule set and looping to step (d); and (g) in response to determining that the additional rule does not exist in the rule set, denying access to the data access request.

52. A computer readable medium containing executable program instructions executed by a processor, comprising:

program instructions that receive a data access request directed to a data container, the data access request having a file handle;

program instructions that examine a field of the file handle to identify a location of the data container to which the data access request is directed;

program instructions that identify a rule set associated with the data container identified by the examination of the file handle;

program instructions that determine if a network address of the received data access request is in the rule set to permit access to the data container;

program instructions that determine, in response to the network address being in the rule set, if a type of access desired by the data access request has a required authentication level; and program instructions that process the data access request in response to having permission to access the data container and having the required authentication level of the type of access desired.

53. A system for limiting access to a data container, comprising:

the system configured to receive a data access request directed to the data container, the data access request having a file handle;

the system further configured to examine the file handle to identify a location of the data container to which the data access request is directed;

the system further configured to identify a rule set associated with the mount point identified by the examination of the file handle;

the system further configured to determine if a network address of the received data access request is in the rule set to permit access to the data container;

the system further configured to determine, in response to the network address being in the rule set, if a type of access desired by the data access request has a required authentication level; and is the system further configured to process the data access request in response to having permission to access the data container and having the required authentication level of the type of access desired.

* * * * *

UNITED STATES PATENT AND TRADEMARK OFFICE
CERTIFICATE OF CORRECTION

PATENT NO. : 7,707,618 B1  Page 1 of 1
APPLICATION NO. : 10/856142
DATED : April 27, 2010
INVENTOR(S) : Benjamin T. H. Cox It is certified that error appears in the above-identified patent and that said Letters Patent is hereby corrected as shown below:

Col. 1, line 24, please amend as shown:
in which information about ~~is~~ other files and directories are Col. 3, line 49, please amend as shown:
fixed path (name) and, as ~~is~~ such, can be applied to any Col. 8, line 3, please amend as shown:
D-blades in the cluster. Thus, any network ~~work~~ port of an Col. 8, line 24, please amend as shown:
~~Mode~~ inode number field 604 and a unique-ifier field 606. The VFS Col. 11, line 11, please amend as shown:
each entry. The ~~to~~ network address field 905 contains a net- Col. 13, line 48, please amend as shown:
been written in terms of limiting access to ~~is~~ a VFS, the Col. 14, line 38, please amend as shown:
in the rule set, selecting a next rule in the ~~export~~ rule set Col. 16, line 63, please amend as shown:
examining a field of the file handle to identify a location of Col. 18, line 54, please amend as shown:
~~is~~ the system further configured to process the data access Signed and Sealed this Twenty-seventh Day of July, 2010

David J. Kappos
*Director of the United States Patent and Trademark Office*